Figure 5:
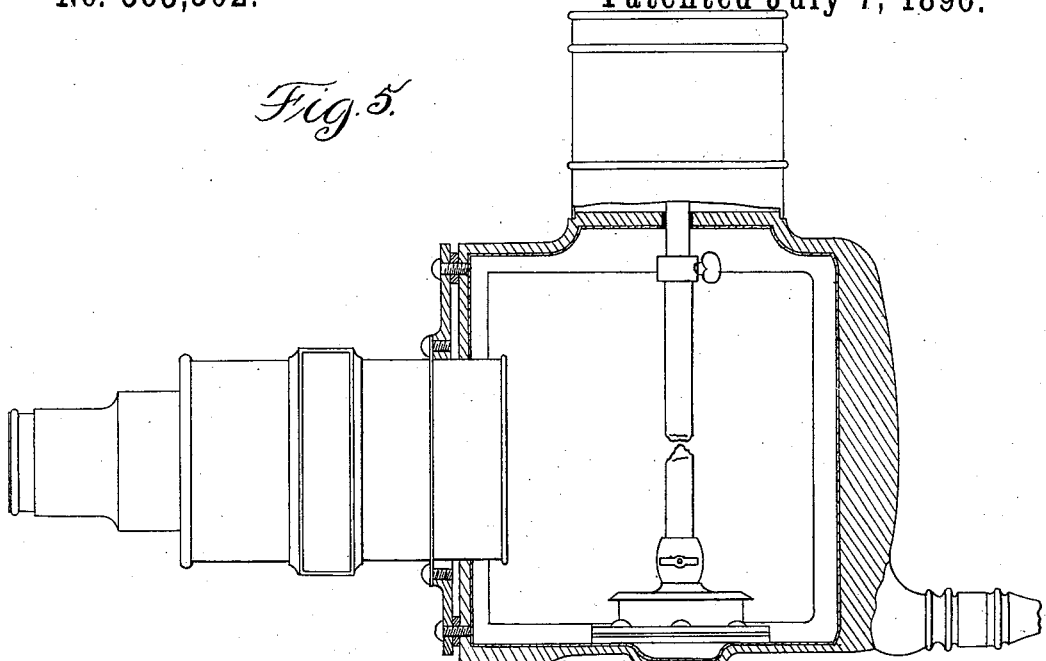

(No Model.) 2 Sheets—Sheet 1.
A. J. OEHRING & A. L. TUCKER.
SCENIC THEATER APPARATUS FOR PRODUCING MOON EFFECTS.
No. 563,302. Patented July 7, 1896.
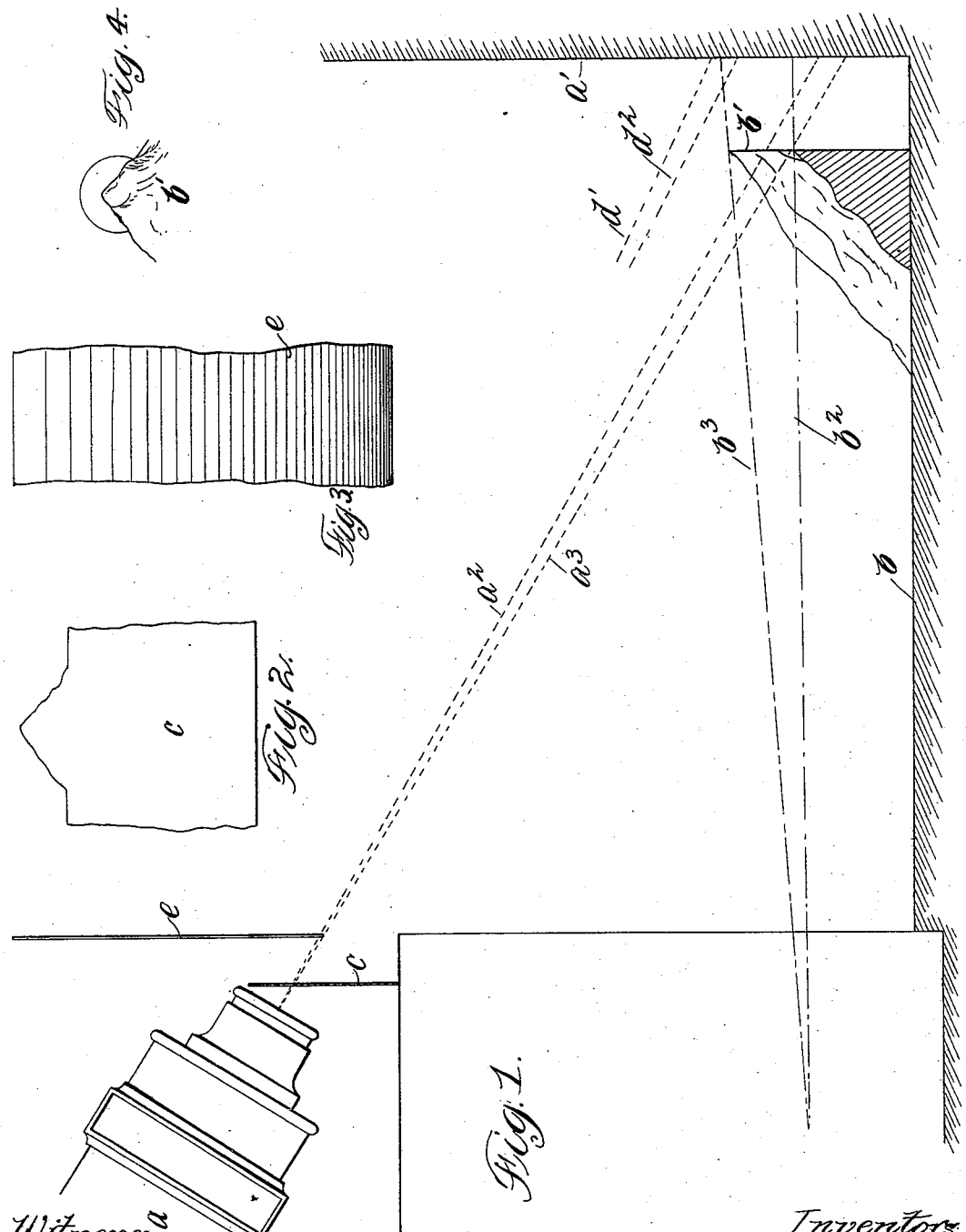
Witnesses:
George L. Cragg
De Witt C. Tanner
Inventors:
August J. Oehring
Albert L. Tucker
By Barton & Brown
Attorneys.
THE NORRIS PETERS CO., PHOTO-LITHO., WASHINGTON, D. C.

(No Model.) 2 Sheets—Sheet 2.

A. J. OEHRING & A. L. TUCKER.
SCENIC THEATER APPARATUS FOR PRODUCING MOON EFFECTS.

No. 563,302. Patented July 7, 1896.

Witnesses:
De Witt C. Tanner.
W. Clyde Jones.

Inventors:
August J. Oehring
Albert L. Tucker
By Barton & Brown
Attorneys.

THE NORRIS PETERS CO., PHOTO-LITHO., WASHINGTON, D. C.

UNITED STATES PATENT OFFICE.

AUGUST J. OEHRING AND ALBERT L. TUCKER, OF CHICAGO, ILLINOIS, ASSIGNORS TO THE WESTERN ELECTRIC COMPANY, OF SAME PLACE.

SCENIC-THEATER APPARATUS FOR PRODUCING MOON EFFECTS.

SPECIFICATION forming part of Letters Patent No. 563,302, dated July 7, 1896.

Application filed May 13, 1895. Serial No. 549,134. (No model.)

*To all whom it may concern:*

Be it known that we, AUGUST J. OEHRING and ALBERT L. TUCKER, citizens of the United States, residing at Chicago, in the county of Cook and State of Illinois, have invented a certain new and useful Improvement in Scenic - Theater Apparatus for Producing Moon Effects, (Oehring, Case No. 14, and Tucker, Case No. 7,) of which the following is a full, clear, concise, and exact description, reference being had to the accompanying drawings, forming a part of this specification.

Our invention relates to scenic-theater apparatus for producing the effect of a traveling moon, our object being to produce the appearance of the moon rising from behind the mountains, hills, or other boundaries of the landscape, or to produce the appearance of the moon descending behind the landscape boundaries.

In the embodiment of our invention which we employ in practice, a spot of light to represent the moon is projected from a lantern upon the wall or curtain of the theater, the lantern being automatically moved to cause the spot of light to travel in a curved path across the projecting curtain. The lantern is located on a raised platform situated above the proscenium-opening, so that the rays pass at an angle from above downward as the light is projected upon the curtain. The mountains or hills which bound the landscape, as seen by the audience, are placed a little in advance of the curtain, so that the light representing the moon at first falls upon the curtain behind the mountains, the moon being thus hid from view. As the lamp moves, the spot of light ascends and presently appears from behind the mountains, thus presenting the appearance of rising back of the mountains. To prevent any of the light projected by the lantern from falling upon the landscape, a screen is placed in front of the lamp, the contour of the upper edge of the screen corresponding to the contour of the landscape as seen in the direction of the rays of the lantern, whereby the portion of the light that would otherwise fall upon the landscape is intercepted. A color-screen is placed in the path of the projected light to impart to the light the desired colors to produce the changing brilliancy of the moon.

Figure 6:
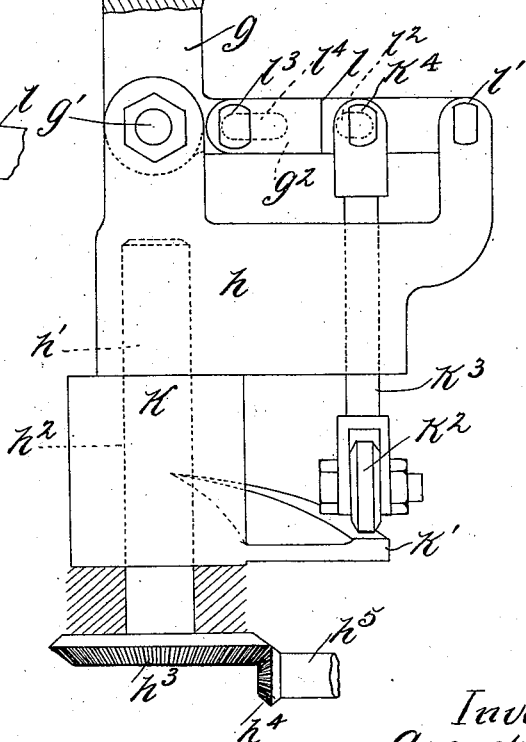

Referring to the accompanying drawings, Figure 1 is a view illustrative of our invention. Fig. 2 is a detached view of a portion of the intercepting screen. Fig. 3 is a view representing a portion of the color-screen. Fig. 4 illustrates the appearance of the moon as it rises from behind a mountain-peak. Fig. 5 is a view in elevation, partly in section, of the lamp of our invention. Fig. 6 is a detached view illustrating the location of the parts when the lantern occupies an oblique position.

Like letters refer to like parts in the several figures.

Referring more particularly to Fig. 1, light from the lantern $a$ is projected upon the wall or curtain $a'$ of the theater, the direction of the rays being indicated by the dotted lines $a^2$ $a^3$, the upper line $a^2$ representing the uppermost ray and the line $a^3$ the lowermost. Upon the stage $b$ is provided the landscape, (represented in the present instance by a mountain-peak $b'$.) The peak $b'$ cuts off from the view of the audience the portion of the curtain $a'$ below the line of sight $b^2$, so that in the position of the lantern illustrated the moon is invisible to the audience.

If some provision were not made, light from the lantern would fall upon the landscape, and to prevent this an intercepting screen $c$ is provided in front of the lantern $a$, the upper edge of the screen having a contour corresponding to the contour of the mountain-peak $b'$, as seen when looking in the direction of the rays projected from the lantern. The rays, which would otherwise fall upon the landscape, are thus intercepted. As the lantern $a$ rises, the spot of light projected upon the curtain $a'$ rises, and as soon as any portion of the light rises above the sight-line $b^2$ of any particular spectator in the audience, a portion of the light will be visible to the spectator. When all of the light rises above the sight-line $b^3$, the whole of the moon will be visible. To the spectator it appears as though the moon gradually rises from behind the mountain-peak, as illustrated in Fig. 4. The dotted lines $d'$ $d^2$ represent the direction of the uppermost and lowermost rays from the lantern $a$ at a time when the spectator sees the moon as it appears in Fig. 4.

In front of the lantern $a$, and in the path of the projected light, is provided a color-curtain $e$, ranging from red at the bottom, through orange, gold, &c., to white at the top, so that, as the moon rises, its brightness gradually increases, while in setting the brightness gradually decreases.

In Figs. 5 and 6 we have illustrated the mechanism for imparting to the lamp the desired movement to cause the moon to travel in a curved path. The casting $g$, which supports the lamp proper, is journaled at $g'$ to a support $h$, being thus capable of motion about a horizontal axis. The support $h$ is journaled to rotate about a vertical axis, a shaft $h'$ secured thereto being mounted in a bearing $h^2$ provided in the standard $k$. Upon the lower end of shaft $h'$ is mounted a bevel-gear $h^3$, adapted to mesh with a bevel-pinion $h^4$, carried upon a revolving shaft $h^5$. As the shaft $h^5$ rotates, the support $h$, and, in consequence, the lantern, are rotated about a vertical axis. Upon the standard $k$ is provided an inclined track $k'$ concentric with the axis of rotation of the support $h$, and upon said track a wheel or roller $k^2$ is adapted to travel. The roller $k^2$ is mounted upon the end of a vertical rod $k^3$, the upper end of said rod being pivoted at $k^4$ to a lever $l$, which is pivoted to the support $h$ at $l'$. The rod $k^3$ passes through a guide provided in the support $h$ to maintain it always in a vertical position, and to accommodate the rotation of the lever $l$ a slot $l^2$ is provided in said lever in which the pin $k^4$ is adapted to travel. Upon the end of lever $l$ is provided a pin $l^3$, adapted to engage a slot $l^4$, provided in the end of an arm $g^2$, provided upon the lamp-casting $g$. As the shaft $h^5$ revolves to rotate the support $h$ about a vertical axis, the rod $k^3$ is carried around with the support $h$, and, the roller moving over the inclined track, the rod $k^3$ is elevated, thus rotating the lever $l$ and elevating the end thereof which is in engagement with the end of arm $g^2$. The end of arm $g^2$ is thus raised, as shown in Fig. 6, and the lantern is rotated about its horizontal axis at the same time that it is rotated about a vertical axis, the two rotations occurring at the same time, causing the light projected by the lantern to travel in a curved path. By properly proportioning the incline of the path and the speed of rotation of the shaft $h^5$ any desired travel of the light may be obtained.

The apparatus as above described may be employed for producing the appearance of the moon descending in the heavens and setting behind the boundaries of the landscape.

Having thus described our invention, what we claim as new, and desire to secure by Letters Patent, is—

1. The combination with a scenic-theater stage provided upon its surface with raised objects to represent the landscape, of a curtain or wall back of said raised objects, a space being provided between said raised objects and said curtain, a lantern situated above and in front of said raised objects and adapted to project its rays upon the portion of the curtain below the top of the raised objects, a screen for intercepting the rays from the lantern that would otherwise fall upon said raised objects, and means for causing said spot of light to ascend or descend, to produce the appearance of the moon rising or setting behind the boundaries of the landscape, substantially as described.

2. The combination with a scenic-theater stage provided upon its surface with raised objects to represent the landscape, of a curtain or wall back of said raised objects, a space being provided between said raised objects and said curtain, a lantern situated above and in front of said raised objects and adapted to project its rays upon the portion of the curtain below the top of the raised objects, means for moving said lamp to cause said spot of light to ascend or descend, and a color-curtain placed in the path of the rays from said lantern, said curtain being colored red at the bottom, gradually changing through the intermediate colors to white at the top, substantially as described.

3. The combination with a projecting lantern, of a support upon which said lantern is mounted to rotate about a horizontal axis, said support being mounted to rotate about a vertical axis, means for rotating said support, an inclined track, a roller adapted to travel thereon and to move with said support, and intermediate mechanism between said roller and said lantern adapted to rotate the lantern upon said horizontal axis as said roller passes along said track, substantially as described.

4. The combination with the support $h$ mounted to rotate about a vertical axis, of the lantern mounted thereon to rotate about a horizontal axis, the inclined track $k'$, the roller $k^2$ mounted upon the end of rod $k^3$, lever $l$ pivoted to support $h$ and to said rod $k^3$, and the arm $g^2$ mounted to rotate with the lamp and pivoted to said lever $l$, substantially as described.

In witness whereof we hereunto subscribe our names this 22d day of September, A. D. 1894.

AUGUST J. OEHRING.
ALBERT L. TUCKER.

Witnesses:
W. CLYDE JONES,
GEORGE L. CRAGG.